United States Patent [19]

Nakamura et al.

[11] Patent Number: 4,680,556
[45] Date of Patent: Jul. 14, 1987

[54] DIGITAL MODULATION APPARATUS

[75] Inventors: Shigeki Nakamura; Makoto Ohnishi, both of Tokyo; Yasufumi Takahashi, Hachioji, all of Japan

[73] Assignee: Hitachi, Ltd., Tokyo, Japan

[21] Appl. No.: 850,097

[22] Filed: Apr. 10, 1986

[30] Foreign Application Priority Data

Apr. 10, 1985 [JP] Japan ................................. 60-74215

[51] Int. Cl.⁴ ............................................. H03C 3/00
[52] U.S. Cl. .................................. 332/16 R; 332/21; 375/67
[58] Field of Search ............... 332/16 R, 21, 22, 23 R; 375/52, 67; 455/110

[56] References Cited

U.S. PATENT DOCUMENTS 4,584,541 4/1986 Nossen .............................. 332/16 R Primary Examiner—Eugene R. Laroche
Assistant Examiner—Robert J. Pascal
Attorney, Agent, or Firm—Antonelli, Terry & Wands

[57] ABSTRACT

A quadrature phase modulator constructed by use of a simple digital circuit. Digital signals of sample data obtained by sampling outputs from a roll-off filter with a frequency four times a modulated carrier frequency are stored in an ROM, the outputs corresponding to all combinations of a plurality of successive bits of input data; the plurality of bits are set as an address, and a signal of an in-phase channel and a signal of a quadrature phase channel is alternately read from the ROM with a frequency equal to half the sampling frequency, then the obtained serial signals are subjected to a digital-to-analog conversion to obtain a quadrature phase modulated signal.

3 Claims, 5 Drawing Figures

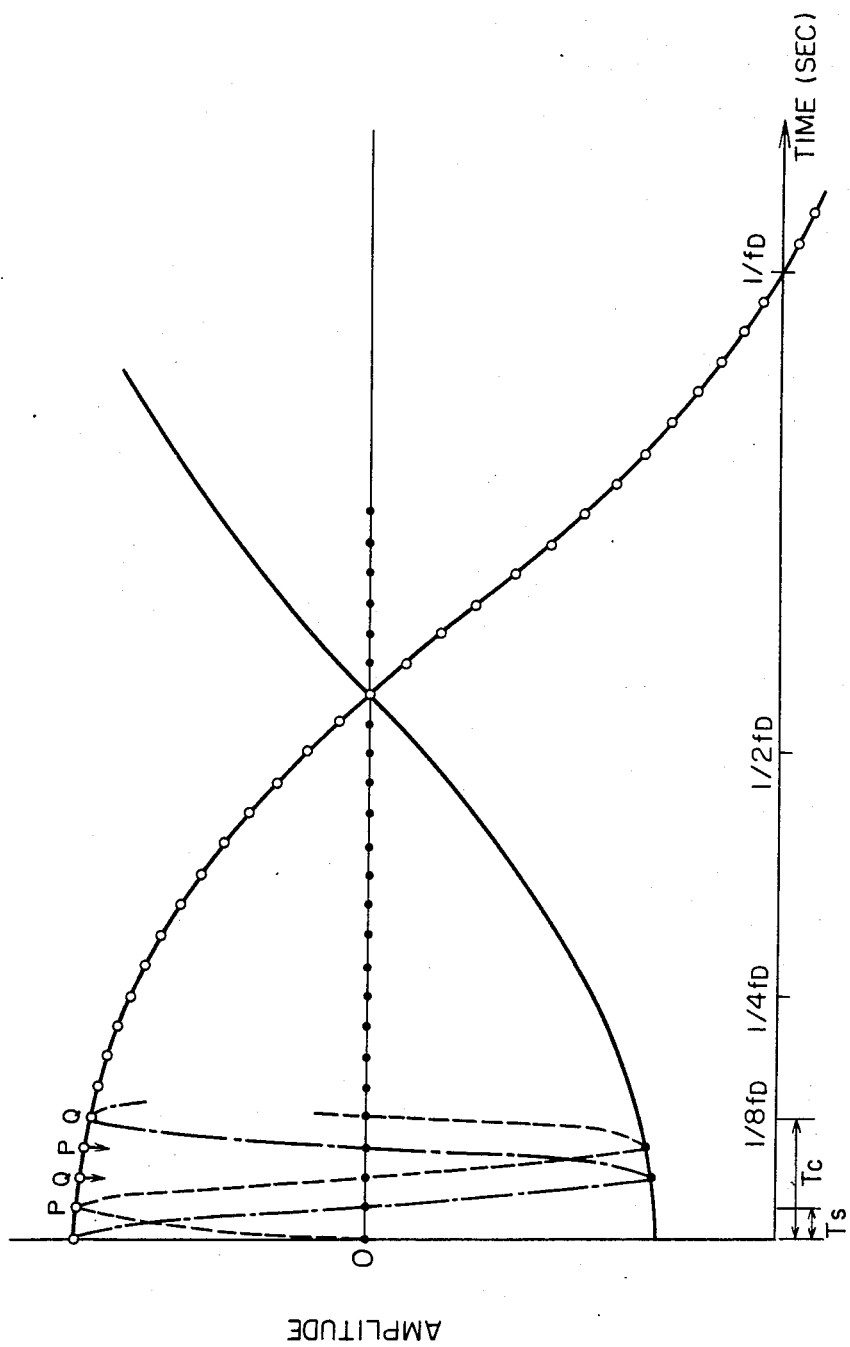

DIGITAL MODULATION APPARATUS

BACKGROUND OF THE INVENTION

Field of the Invention

The present invention relates to a digital modulation apparatus, and in particular, to a modulator such as a quadrature phase shift keying (QPSK) modulator implementing, by use of digital signal processing means, a circuit in which a phase of a carrier is shifted by an integral multiple of $\pi/2$ according to an input signal, thereby accomplishing a modulation.

Description of the Prior Art

A system such as a QPSK modulator, having a phase modulator modulating orthogonal carrier waves by data to be transmitted, is configured by the digital technology which performs waveform shaping and an analog circuit which has been commonly used to modulate the carrier waves. In addition, a circuit modulating a carrier in a digital fashion is also known; however, as described in the Japanese Patent Unexamined Publication No. 53-24763 (Data Transmission System), a plurality of ROM's and adders are required, namely, the complexity of the circuit structure was not considered.

SUMMARY OF THE INVENTION

It is therefore an object of the present invention to provide a digital phase modulator without using an adder in which a quadrature phase modulation circuit is constituted with only one read only memory (ROM) and a roll-off filtering operation and carrier modulation are completely achieved by a digital circuit, thereby removing the prior art drawbacks.

To this end, according to the present invention, the digital phase modulator includes a memory containing quantized values corresponding to sample values obtained by sampling with a frequency four times that of a carrier frequency an output waveform generated from a plurality of successive bits of input data by a roll-off filter, wherein said plurality of successive bits of the input data are translated into an address indicating the content stored in said memory and a digital-to-analog (D/A) conversion is conducted on the quantized values of the content associated with said address, namely, a digital signal representing the quantized values, thereby attaining a modulated signal.

As a favorable embodiment, the memory is constituted by a read only memory (ROM). In an implementation of a quadrature phase modulator, when the read operation on the memory is achieved by use of a frequency half that of the carrier frequency, a signal subjected to a quadrature shift keying modulation is obtained.

According to the present invention as described above, there is provided a digital phase modulator in which when a ROM address is specified corresponding to a value of a counter indicating a sampling point so as to read the content of the ROM, a signal subjected to a waveform filtering and a carrier modulation is readily generated by a digital processing in a simple digital circuit configuration without requiring a plurality of ROM's and adders.

The above-mentioned and other features and objects of this invention will become more apparent with reference to the following description taken in conjunction with the accompanying drawings.

BRIEF DESCRIPTION OF THE DRAWINGS

FIG. 5 is a partially magnified graph depicting a modulated signal for explaining the principle of the present invention.

DESCRIPTION OF THE PREFERRED EMBODIMENTS

Figure 1:
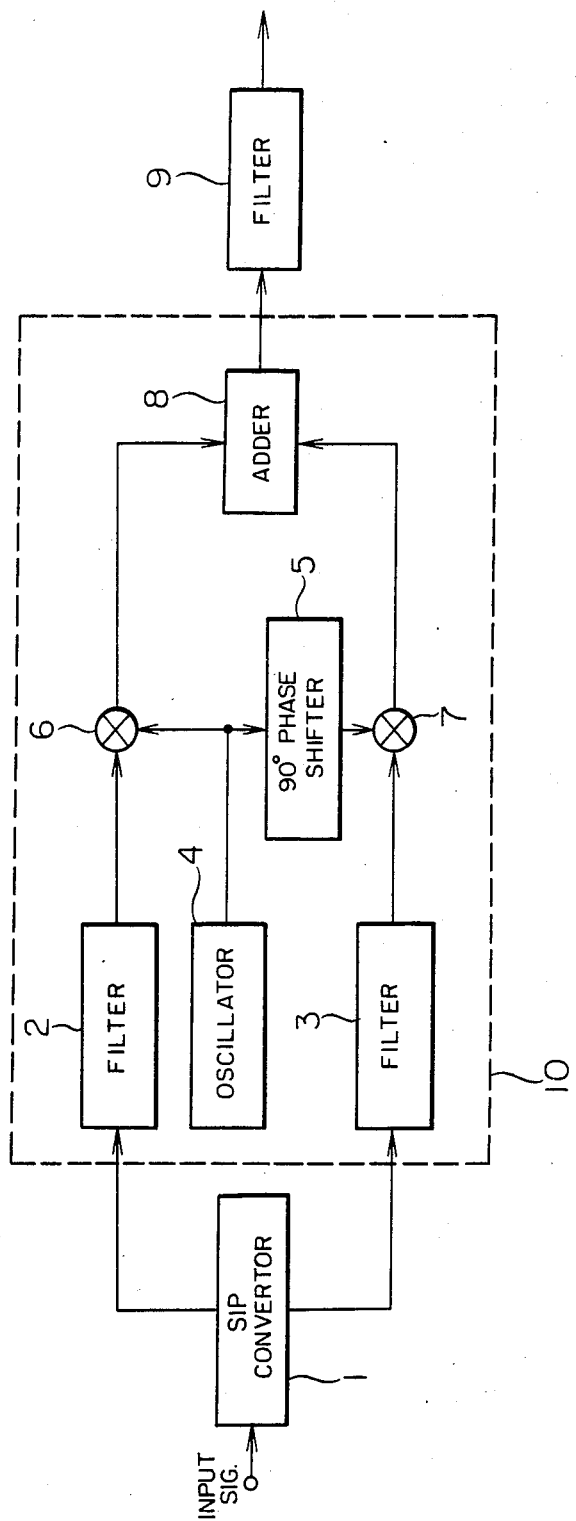
FIG. 1 is a schematic circuit diagram illustrating a configuration of the conventional analog quadrature phase modulator.

For facilitating an understanding of the present invention, a quadrature phase modulator operating according to the prior art analog processing will be first described with reference to FIG. 1. An input signal comprising binary serial data is converted into a 2-bit parallel signal in a serial-parallel converter 1, the 2-bit parallel signal being (0, 0), (1, 0), (0, 1), or (1, 1). The 2-bit signal is converted into a pulse waveform by roll-off filters 2 and 3, respectively. A part of a carrier signal outputted from an oscillator 4 is modulated by a balanced modulator 6 according to an output from the roll-off filter 2, whereas the other output thereof undergoes a phase shift of 90° by a 90° phase shifter 4 and the resultant signal is modulated by a balanced modulator 7 according to an output from the roll-off filter 3. Outputs from the two balanced modulators 6-7 are added by an adder 8, thereby generating a signal subjected to a quadrature phase modulation.

The configuration and operations of the prior art phase modulator are commonly known, so the description thereof will be omitted.

Figure 2:
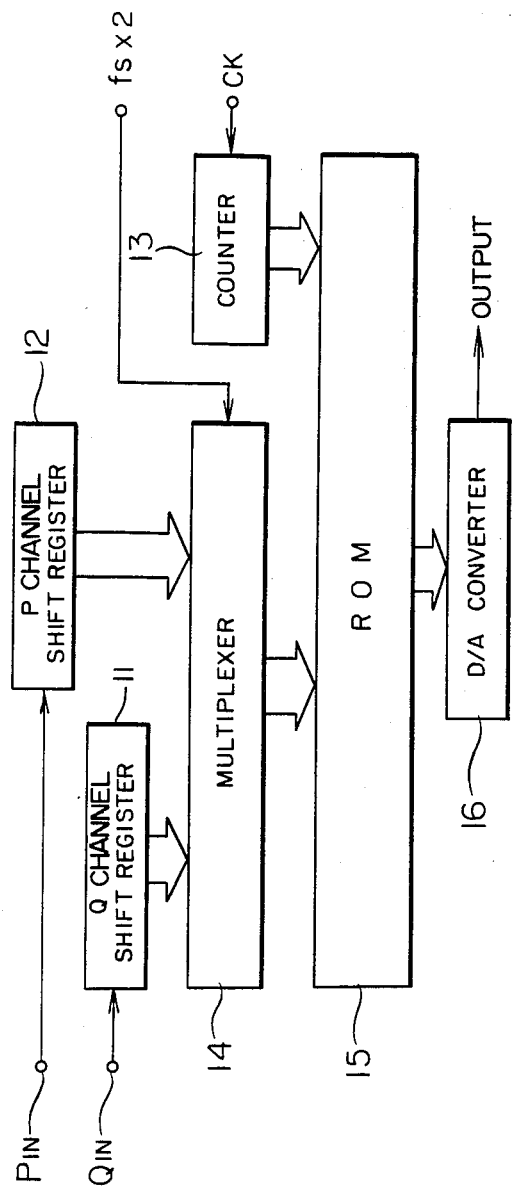
FIG. 2 is a block diagram depicting an embodiment of the digital modulator according to the present invention.

FIG. 2 is a block diagram illustrating a configuration of an embodiment of a digital modulator according to the present invention which effects the function of the portion enclosed by broken lines in FIG. 1. The circuit comprises n-stage shift registers 11–12, a counter 13, a multiplexer 14, an ROM 15, and a D/A converter 16.

Referring now to the waveform graphs of FIGS. 3–4, the operation of the embodiment will be described.

Figure 3:
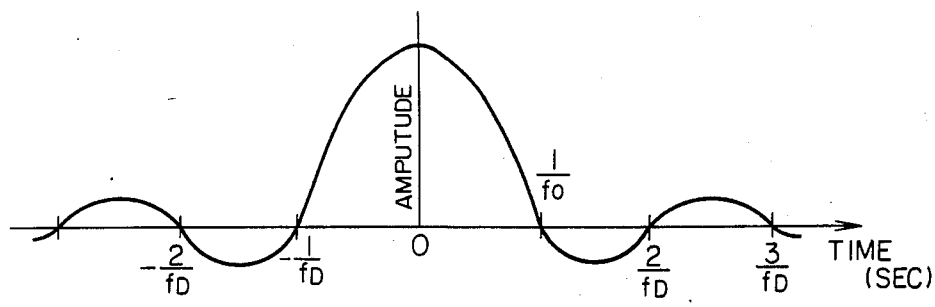
FIG. 3 is a graph showing a waveform of an impulse response of a roll-off filter.

FIG. 3 is a graph illustrating an impulse response which must be developed by the roll-off filters 2–3 of FIG. 1 when a single pulse is applied thereto. Actually, however, input data with a frequency of $1/f_D$ is applied thereto in place of the single pulse, and hence the output from each filter is represented by a waveform obtained by combining impulse responses of a plurality of successive bit signals.

Figure 4:
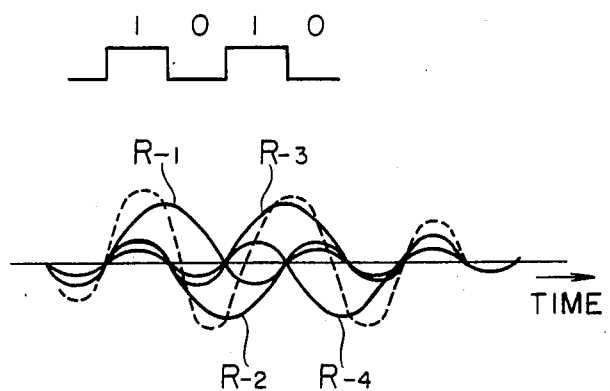
FIG. 4 is a graph illustrating response waveforms of a roll-off filter with respect to four successive bits of input data.

In FIG. 4, response waveforms R-1, R-2, R-3, and R-4 correspond to a sequence of four bits "1010" by assuming the number of successive bits of input data to be four for simplicity. A waveform obtained by combining these response waveforms is drawn with a dotted line. The bit length is about eight in ordinary cases.

FIG. 5 is a graph showing a waveform of a signal generated by modulating the carrier signal with the impulse response waveform for simplicity in which a portion in a range of time from 0 to $1/f_D$ second is magnified. In actual practice the modulation is achieved with the composite waveform (dotted line) of FIG. 4.

An operation sampling cycle $T_S$ is set to $\frac{1}{4}$ of a cycle $T_C$ of a carrier signal frequency $f_C$ (516 KHz, for example), namely, the sampling operation is effected by a frequency four times the carrier frequency $f_C$. Assuming that the sampling points, namely, the time responses of the phases P and Q appear alternately and discretely, the values sampled for P and Q, respectively with a cycle two times the cycle $T_C$ are changed in polarity, namely multiplied by (+1) and (−1) next, respectively. In this case, since the carriers P and Q have a phase difference of 90° therebetween, the output of phase Q is 0 at a time when the output of phase P exists ($\neq 0$), and vice versa. Moreover, the sampling cycle satisfies the sampling theorem (the sampling frequency is at least two times the maximum frequency of the signal).

Consequently, a discretely quantized value of a waveform subjected to the quadrature phase modulation can be attained from the values resulting from the operation substituting the sampling values of time response signals from the roll-off filter according to the relationships described above.

Returning now to FIG. 2, input terminals $P_{IN}$ and $Q_{IN}$ are sequentially supplied with P-channel input data and Q-channel input data, respectively with the frequency $f_D$, and these input data items are written in a P-channel shift register 12 and a Q-channel shift register 11, respectively. A ROM 15 beforehand contains data which is the result of combining with respect to time according to the sampling period the filter time responses obtained for all combinations of data patterns associated with the shift registers 11-12 as described above. The data items representing the states of the P-channel and Q-channel shift registers 11 and 12, respectively are alternately extracted through the multiplexer 14 in synchronism with a clock signal shifted by $T_S$ with a cycle two times the sampling cycle $T_S$. Since the sampling cycle $T_S$ is 1/32 of the cycle related to the data rate of the input data, the output from the multiplexer 14 alternately holds the same state 32 times for the P and Q channels, namely, the same data is held for total 64 times of operations. For a bit pattern associated with this state, the counter 13 counts a clock CK having a cycle equal to 1/16 of the data rate, thereby determining the sampling point.

Consequently, based on the bit pattern delivered from the multiplexer 14 and the count information supplied from the counter 13, an address can be determined for the information in the ROM 15 according to a one-to-one correspondence. Since the ROM 15 contains the sampling value of the filter time response calculated in accordance with the principle described above, the discretely quantized value of the waveform subjected to the quadrature phase modulation can be obtained by reading the sampling value.

According to the present invention, a filter time response is obtained by a computer or the like, a modulated waveform is calculated from the filter time response and is stored in a ROM, and the content of the ROM is read according to an input data and a value of a counter indicating a sampling point, thereby outputting the modulated waveform to a D/A converter, which enables a higher-speed phase modulation in a simple circuit configuration without necessitating a multiplexer and an adder. The phase modulator of the present invention therefore has advantages such as a performance which is improved, the adjustment is not necessary, the size of the circuit is minimized, and the power requirement is reduced.

We claim:

1. A digital modulator comprising:
   first means including memory elements for storing quantized values obtained by combining impulse responses from a roll-off filter which operates at a sampling frequency which is four times the frequency of a modulated carrier signal for a length of successive input data bits;
   second means for determining an address, for a bit pattern associated with the bit length of the input data, indicating a content stored in said memory elements; and
   third means for effecting a D/A conversion on the quantized value obtained from said first means.

2. A digital modulator according to claim 1 wherein said memory elements of said first means are provided in the form of a ROM.

3. A digital modulator according to claim 1 wherein said second means includes:
   a first shift register and a second shift register connected to receive and store data from a P (in phase) channel and a Q (quadrature) channel for input data, respectively;
   multiplexer means for fetching data stored in said first and second shift registers in an alternating fashion in synchronism with a clock signal subjected to said sampling frequency; and
   counter means for counting said clock signal;
   the outputs of said counter means and said multiplexer means specifying said address of the memory elements of said first means.

* * * * *